United States Patent [19]
Frank et al.

[11] Patent Number: 6,141,850
[45] Date of Patent: Nov. 7, 2000

[54] EXTENDED WIDTH MOTOR HOME CONSTRUCTION

[75] Inventors: Ronald R. Frank, Columbiaville; Paul A. Lefler, Marlette; Duane H. Long, Decker; James K. Ramsey, Marlette, all of Mich.

[73] Assignee: Frank Industries, Inc., Brown City, Mich.

[21] Appl. No.: 08/956,731

[22] Filed: Oct. 23, 1997

[51] Int. Cl.[7] ........................................................ B23P 17/00
[52] U.S. Cl. ........................ 29/401.1; 29/416; 29/402.06; 29/897.2
[58] Field of Search .............................. 29/402.02, 402.03, 29/402.04, 402.06, 402.07, 402.09, 402.12, 402.13, 897.2, 401.1, 416

[56] References Cited

U.S. PATENT DOCUMENTS

| | | |
|---|---|---|
| 1,327,883 | 1/1920 | Schuler . |
| 2,278,450 | 4/1942 | Jones . |
| 3,797,880 | 3/1974 | Pezzaglia . |
| 4,342,146 | 8/1982 | Hanson . |
| 4,605,257 | 8/1986 | Lang et al. .......................... 29/401.1 X |
| 5,098,148 | 3/1992 | Hoban ................................ 29/401.1 X |

*Primary Examiner*—S. Thomas Hughes
*Assistant Examiner*—Steve Blount
*Attorney, Agent, or Firm*—Dykema Gossett PLLC

[57] ABSTRACT

An extended width motor home construction has a vehicle body having a floor with a longitudinal gap separating the floor into a first body portion and a second body portion. An insert panel traverses the gap. A method of forming an extended width automotive vehicle comprises the steps of: cutting the floor of the vehicle in a longitudinal direction to form a side portion and a center portion; forming a wedge-shape gap between the side portion and the center portion; coupling an insert panel between the side portion and center portion to traverse the gap.

19 Claims, 2 Drawing Sheets

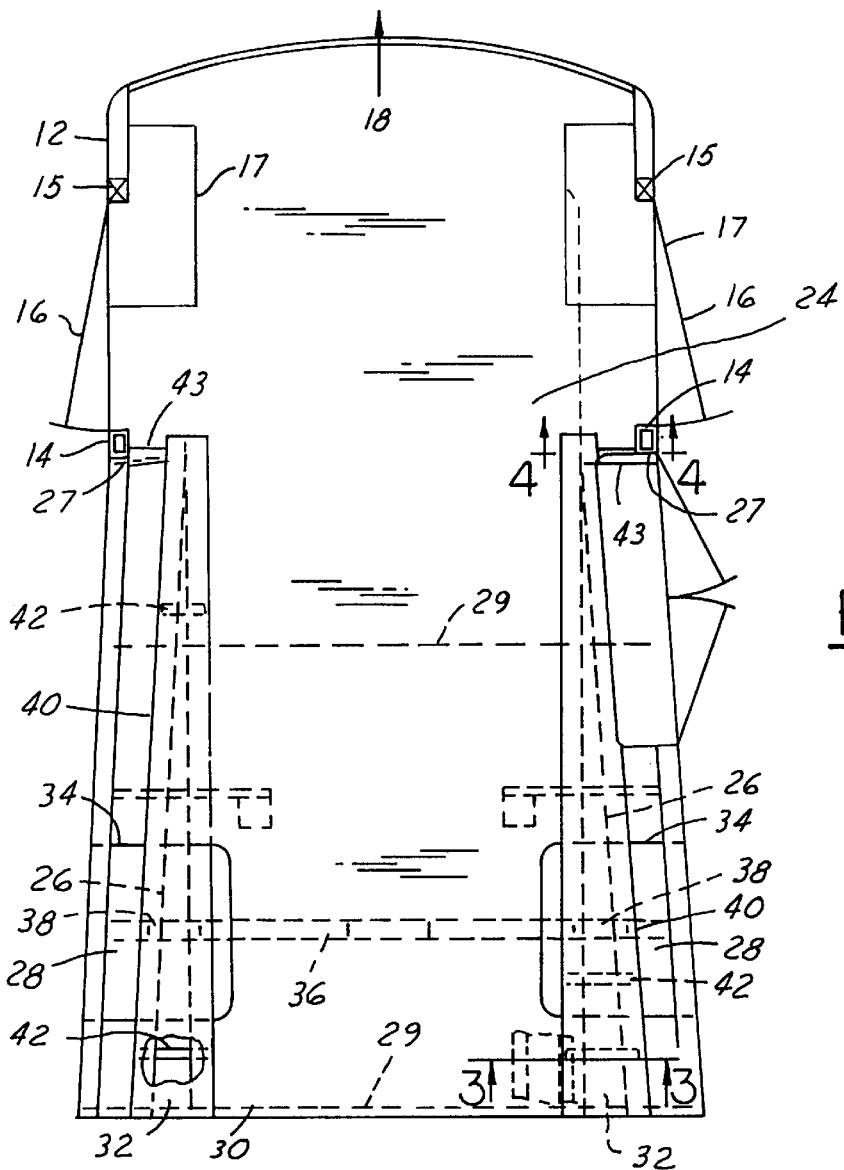
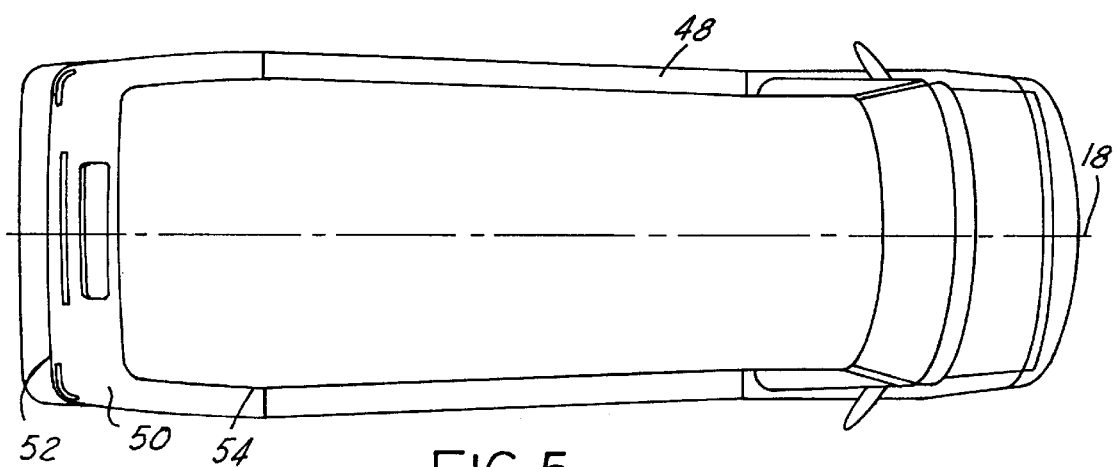

EXTENDED WIDTH MOTOR HOME CONSTRUCTION

BACKGROUND OF THE INVENTION

The present invention relates generally to motor home construction for use with conventional vans and, more particularly, to extending the width of a van body to increase the interior volume.

Standard size van bodies are commonly used for forming motor homes. It is desirable, however, to increase the volume of space within a standard van body to increase the feature content of the motor home. To increase in the interior volume of a van, typically the roof is removed and replaced with a roof cap that increases the interior head room within the vehicle.

Another manner in which the interior volume of a vehicle body may be increased is by lengthening. A vehicle body may be lengthened in two manners. The first manner is by adding a body extension onto the back of the vehicle. Several feet may be added in this manner. By lengthening the body in this manner, the powertrain does not require modification.

Another manner in which the body may be lengthened is to add a length of a vehicle body in the center portion of the vehicle. That is, adding a center portion between the front and rear wheels in a similar manner to that performed for many limousines. In such a manner, the drive shaft of the vehicle must be lengthened.

Another manner in which to increase the interior volume of a vehicle is to widen the vehicle. One manner in which to widen a vehicle is to longitudinally cut the vehicle in two through the entire vehicle body. By increasing the vehicle width in such a manner, many structural changes as well as changes to the powertrain must be made to to make the vehicle functional. The front portion of the vehicle requires numerous modifications. For example, the windshield, the method for mounting the engine, the dashboard and drive line must all be modified. Performing such changes increases costs of manufacturing such a vehicle.

It is, however, desirable to increase the interior space of an automotive vehicle by increasing at least a portion of the width of the automotive vehicle.

SUMMARY OF THE INVENTION

It is therefore an object of the present invention to increase the width of the rear portion of the automotive vehicle.

In one aspect of the invention the vehicle body has a floor having a longitudinal wedge-shaped gap separating the floor into a first body portion and a second body portion. An insert panel traverses the gap. Typically, one longitudinal wedge-shaped gap near each side of the vehicle is used.

In a further aspect of the invention a new roof and rear portion of the vehicle are installed on the vehicle body to accommodate the extended width portion and enclose the vehicle body.

In another aspect of the invention, a method of forming an automotive vehicle comprises the steps of: cutting the floor of the vehicle in a longitudinal direction to form a side portion and a center portion; forming a wedge-shaped gap between the side portion and the center portion; coupling an insert panel between the side portion and center portion to traverse the gap.

In a further aspect of the method of forming an automotive vehicle may include coupling reinforcement members below the floor to further reinforce the wedge-shaped gap.

One advantage of the present invention is that the width of the front of the vehicle is not increased. In such a manner the instrument panel and mechanical features in the front of the vehicle are not disturbed. Thus, the cost of producing such a vehicle is less than many prior ways in which to increase interior volume.

BRIEF DESCRIPTION OF THE DRAWINGS

Other features and advantages of the present invention will become apparent in the following detailed description which should be read in conjunction with the drawings in which:

FIG. 2 is a plan view of an automotive vehicle formed according to the present invention;

FIG. 5 is a top view of a motor home formed according to the present invention.

DETAILED DESCRIPTION OF THE PREFERRED EMBODIMENT

Figure 1:
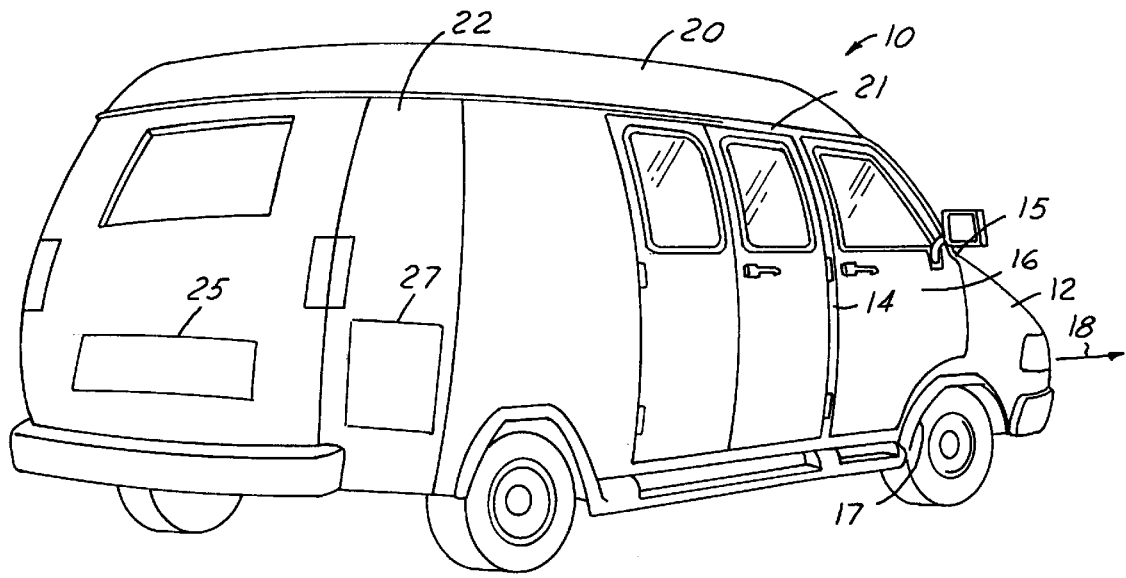
FIG. 1 is a perspective view of an automotive vehicle having a widened vehicle body according to the present invention.

In the following figures, like reference numerals will be used to represent like components. The figures illustrate the widening of a motor home using a standard van body. However, a method for widening a vehicle body may be equally applicable to several types of passenger cars, sport utility vehicles and mini vans.

Referring now to FIG. 1, an automotive vehicle 10 has a body 12 formed according to the present invention. Body 12 has a B-pillar 14. B-pillar 14 is commonly known in the art as the support structure directly rearward front doors 16 of vehicle 10.

Automotive vehicle 10 has a longitudinal axis 18. The terms, interior, exterior, rearward and forward as used in this description are related to vehicle body 12 and the driving position with respect to the normal direction of operation of the vehicle.

Body 12 is widened from that of a standard van body. As illustrated, the widening begins rearward of B-pillar 14. By widening vehicle 10 rearward of B-pillar 14, doors 16 and any components forward of B-pillar 14 may not have to be substantially modified, if at all. Vehicle 10 may also be widened forward of B-pillar 14, but the cost of performing such an operation may be increased due to having to re-fit doors 16 and modify components forward of B-pillar 14. In one constructed embodiment, the body was widened to a point near A-pillar 15, i.e., to a point within front wheel well 17. The A-pillar is about ⅔ of the way forward of the rear edge of wheel well 17.

Vehicle body 12 has a roof 20. Roof 20 is a replacement roof for the vehicle. Replacement roof 20 preferably extends above the former roof line 21 of automotive vehicle 10 to increase the head room and thus further increase the interior volume of vehicle body 10.

Vehicle body 12 has a rear portion 22. Rear portion 22 is a replacement for the standard rear portion provided with the vehicle. Rear portion 22 may include vehicle doors (not shown) or an escape window 23 so that occupants may exit vehicle 10. A door 25 provides access to storage in the rear of the vehicle. A second door 27 may also be provided to access a compartment from the side of the vehicle. Both roof 20 and rear portion 22 are sized larger than the roof portions and rear portions provided with the vehicle so that the extended width is accommodated. The roof 20 and rear portion 22 may be made of steel or fiberglass. Preferably roof 20 and rear portion 22 are integrally formed. Rear portion 22, as will be described further below in FIG. 5, preferably does not continue extending the width.

Referring now to FIG. 2, a floor 24 of automotive vehicle 10 is shown. Floor 24 is shown as a planar member for simplicity. Floor 24 may, however, be corrugated longitudinally to increase strength as is common in the industry. Prior to the widening process, the standard roof and rear portion are cut and removed from the standard van body in a conventional manner. Telescoping jigs 29 are installed laterally across the vehicle to support side portions 28 during the remainder of the conversion operation. Jigs 29 are removed after the roof 20 and rear portion 22 have been installed. Preferably at least three jigs 29 are used. Two jigs 29 are preferably placed near and laterally across the rear of vehicle 10. One of the rear jigs 29 is near the top of the side and one is located near floor 24. Another jig 29 is preferably placed between the B-pillar 14 and the rear of vehicle 10 near the top of side portions 28.

Two pairs of cuts may be made during the widening process; longitudinal cuts 26 and lateral cuts 27. Longitudinal cuts 26 extend from the rear of the vehicle forward to near B-pillars 14. As mentioned above, longitudinal cuts may extend forward to B-pillar 14 or may extend forward of B-pillar 14. In one constructed embodiment, longitudinal cut 26 extended near A-pillar 15.

Longitudinal cuts 26 thus divide vehicle floor into side portions 28 and a center portion 30. Side portions 28 are pulled outward from center portion 30 to preferably form a generally wedge-shaped gap 32 between side portions 28 and center portion 30. Longitudinal cuts 26 are preferably made between the vehicle frame and the sides of the vehicle. However, if vehicle 10 does not have a frame such as in a unibody construction, longitudinal cuts 26 are preferably made between the support structure of the body and the side of the vehicle. Longitudinal cuts 26 preferably extend through wheel wells 34. In such manner, the width of wheel wells 34 are also extended.

Longitudinal cuts 26 may also extend through a cross member 36 of the vehicle support structure such as the frame. A pair of splices 38 may be added to extend cross member 36. Splice 38 is sized and shaped similar to that of cross member 36. Splice 28 may be coupled to cross member 36 in a conventional manner such as by welding. The structural integrity of the cross member is maintained.

An insert panel 40 may be used to traverse wedge-shaped gap 32. Insert panel 40 may also be generally wedge-shaped or be rectangular sized just larger than the wedge-shaped gap 32 so that floor 24 supports insert panel 40. In one constructed embodiment, insert panel 40 is formed of sheet metal thicker than that of floor 24 to maintain rigidity in the vehicle and floor 24.

Insert panel 40 may also be formed of sheet metal having the same thickness or less than floor 24. In such a manner it is desirable to provide reinforcement members 42. Reinforcement members 42 may extend underneath floor 24. Reinforcement members 42 may span the gap to provide structural rigidity. Reinforcement member 42 may be a vertically placed piece of metal stock. In a constructed embodiment a quarter inch thick by 3½ inch wide piece of stock was used.

Reinforcement members 42 may also be used to support insert panel 40. As would be evident to those in the art, the amount of reinforcement required depends on the other supporting structures of the vehicle and the size of gap 32.

Lateral cut 27 is preferably a wedge-shaped cut that is near the forwardmost end of longitudinal cut 26 just behind each B-pillar 14. Lateral cut 27 allows side portions 28 to be pulled away from center portion 30 without substantially bending or wrinkling floor 24. Lateral cut 27 is a wedge-shaped cut that extends through side portion 28 and extends to the forwardmost point of longitudinal cut 26. A second insert panel 43 is used to cover lateral cut 27. Lateral cut 27 may be necessary in certain circumstances depending to the geometry of the vehicle and the thicknesses of the components. For example, if floor 24 may be easily deformed when forming wedge-shaped gap, no lateral cut may be necessary. In the case of the longitudinal cut extending to near the A-pillar 15, no lateral cut need be made.

Figure 3:
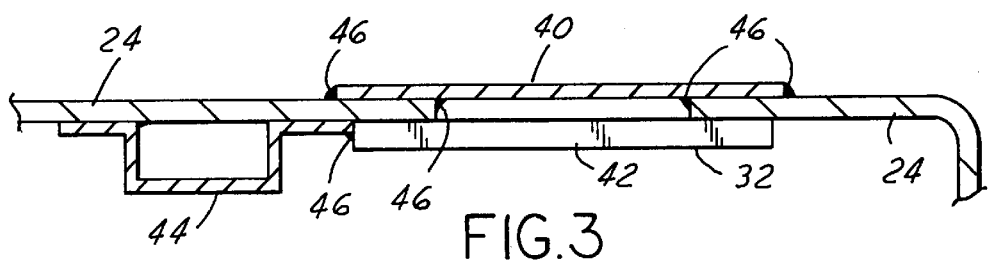
FIG. 3 is a cross-sectional view of an insert panel traversing a longitudinal gap along line 3—3 of FIG. 2.

Referring now to FIG. 3, a cross-sectional view through an insert panel 40 and optional reinforcement members 42 are shown with respect to floor 24. A frame member 44 is also shown coupled to center portion 30. As shown, frame member 44 is a separate upside down hat-section coupled to floor 24. Frame 44 may also be integrally a separate piece onto which body 12 is placed. Insert panel 40 is preferably welded to floor 24 at several locations, For example, weld material 46 may be applied adjacent the interior of floor 24 and insert panel 40. Weld material 46 may also be applied under insert panel 40 and under floor 24. Welding may be done continuously along the seam. Welding, however, may be done intermittently along the edge. After welding, the edges may be sealed using a plastic based sealer commonly known in the industry. Sealing the joint helps inhibit corrosion.

Reinforcement members 42, if used, may also be joined to the exterior of floor 24 by welding. Reinforcement members 42 increase the structural rigidity of floor 24.

Figure 4:
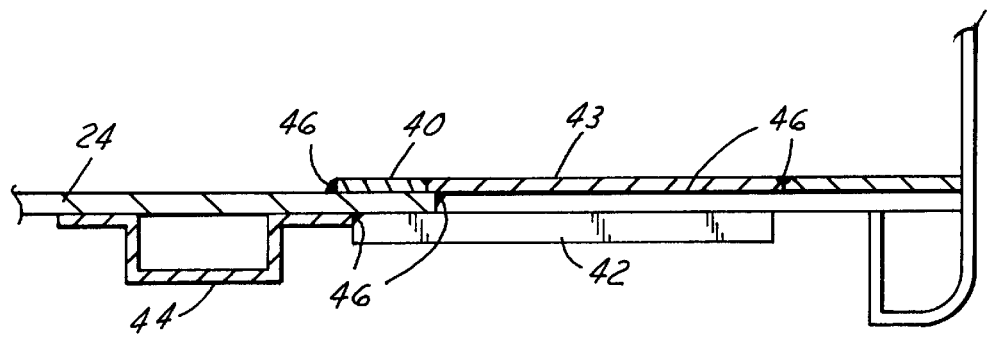
FIG. 4 is a cross-sectional view of an insert panel traversing a lateral gap along line 4—4 of FIG. 2.

Referring now to FIG. 4, a cross-sectional view at lateral cut 26 through second insert panel 43 is shown with respect to floor 24. A frame member 44 is also shown coupled to center portion 30. Insert panel 43 is preferably welded to floor 24 at several locations. For example, weld material 46 may be applied adjacent the interior of floor 24 and second insert panel 43. Weld material 46 may also be applied under second insert panel 43 and under floor 24.

In operation, any style of automotive vehicle may be altered according to the present invention. It is preferred that both the conventional roof and rear portion of the van are removed prior to performing widening. Telescoping jigs 29 are used to maintain rigidity of the vehicle and side portions 28 during conversion. At a minimum, however, rear portion 22 may be removed and roof 20 may be widened in a similar fashion to that of floor 24. Longitudinal cuts 26 are made in floor 24 and extend preferably parallel to longitudinal axis 18 from the rear of the vehicle forward to a point where widening is no longer desired. Lateral cuts 27 may be made prior to, or after, longitudinal cuts 26. Longitudinal cuts 26 are then opened to form a side portion 28 and a center portion 30. In the preferred embodiment the wedge-shaped gap 32 formed between side portion 28 and center portion 30 is approximately four inches. Preferably hydraulic jacks are used to create the separating force between the center portion and side portion. As the wedge shape gap is formed, telescoping jigs 29 are also extended to compensate for the widening body. The rear of the vehicle is preferably widened a total of approximately eight inches using two gaps. Insert panel 40 is coupled to the floor 24 to cover wedge-shaped gap 32. Insert panel 40 is preferably welded. Other means of attachment such as rivets which may also be used to couple insert panel 40 to floor 24.

Second insert panel 43 is also coupled to floor 24 in a similar manner to first insert panel 40. Second insert panel 43 may be coupled to floor 24 at the same time as first insert panel 40.

After insert panel 40 is coupled to floor 24, a widened roof 20 as well as a widened rear portion 22 both accommodating the extended vehicle width are mounted to vehicle 10. It is preferred that rear portion 22 and roof 20 are integrally formed as a singular unit to be installed on the vehicle. The new rear portion 22 preferably extends longitudinally beyond the rear of the vehicle to further increase the interior space within the vehicle body.

After insert panels 40 and second insert panels 43 are coupled to floor 24, the assembly is sealed to prevent corrosion and leaks.

Referring now to FIG. 5, a top view of vehicle 10 is shown having a widened portion 48 and an extended portion 50. It is preferred that extended portion 50 does not continue widening as in widened portion 48. The rearward end 52 of extended portion 50 may actually extend in slightly from the widest point 54 of vehicle body. Widest point 54 is where widened portion 48 and extended portion 50 come together. Of course, rear portion 22 may continue widening the vehicle. But, such widening may not be aesthetically pleasing.

While the best mode for carrying out the present invention has been described in detail, those familiar with the art to which this invention relates will recognize various alternative designs and embodiments for practicing the invention as defined by the following claims:

What is claimed is:

1. A method of forming an automotive vehicle having a body with a floor and a frame comprising the steps of:
    cutting a cut in the body of the vehicle in a generally longitudinal direction, said cut extending from a rear of the vehicle and terminating at a forward point located before the front of the vehicle to form a side portion and a center portion;
    forming a gap between the side portion and the center portion by spreading the side and center portions apart from each other about said forward point; and
    coupling an insert panel between the side portion and the center portion to traverse said gap.

2. A method of forming an automotive vehicle as recited in claims 1, further comprising the step of coupling a plurality of support members to bridge the gap between the side portion and center portion.

3. A method of forming an automotive vehicle as recited in claims 1, further comprising the step of removing a roof from the vehicle.

4. A method of forming an automotive vehicle as recited in claim 1, further comprising the step of removing a rear portion of the vehicle.

5. A method of forming an automotive vehicle as recited in claim 1, wherein the step of cutting includes the step of cutting the body of the vehicle between the frame and an exterior wall of the body.

6. A method of forming an automotive vehicle as recited in claim 1, wherein the step of cutting includes the step of cutting a cross member.

7. A method of forming an automotive vehicle as recited in claim 6, further comprising the step of coupling a splice to said cross member.

8. A method of forming an automotive vehicle as recited in claim 1, wherein the step of cutting includes the step of cutting a wheel well.

9. A method of forming an automotive vehicle as recited in claim 1, wherein said vehicle has a front wheel well, said gap extending forward within a point rearward of said front wheel well.

10. A method of forming an automotive vehicle as recited in claim 1, wherein the insert panel has a wedge-shape or rectangular shape.

11. A method of forming an automotive vehicle as recited in claim 1, wherein said gap has a wedge-shape.

12. A method of forming an automotive vehicle as recited in claim 1, further comprising the step of cutting a wedge-shaped cut in the side portion in a lateral direction.

13. A method of forming an automotive vehicle as recited in claim 12, further comprising the step of coupling a second insert panel over the wedge-shaped cut.

14. A method of forming an automotive vehicle as recited in claim 1, wherein the vehicle includes a front wheel well and the point before the front of the vehicle is located rearward of the front wheel well.

15. A method of forming an automotive vehicle having a body with a floor and a frame comprising the steps of:
    cutting a cut in the floor of the vehicle in a generally longitudinal direction, said cut extending from a rear of the vehicle and terminating at a first point rearward of a first front wheel well to form a first side portion and a center portion;
    cutting the floor of the vehicle in a generally lateral direction from an outer side of the first side portion to a second point proximate the first point;
    forming a first gap between the first side portion and the center portion by spreading the first side portion and the center portions apart from each other about the said first point; and
    coupling a first insert panel between the first side portion and the center portion to traverse the first gap.

16. A method of forming an automotive vehicle as recited in claim 15, wherein the step of cutting the floor of the vehicle in a generally lateral direction from an outer side of the first side portion to a second point proximate the first point includes the step of making a wedge-shaped cut in the first side portion.

17. A method of forming an automotive vehicle as recited in claim 16, further comprising the step of coupling a second insert panel over the wedge-shaped cut in the first side portion.

18. A method of forming an automotive vehicle as recited in claim 15, further comprising the steps of:
    cutting the floor of the vehicle in a generally longitudinal direction from the rear of the vehicle forward to a third point rearward of a second front wheel well to form a second side portion, said center portion being disposed between the first side portion and the second side portion;
    cutting the floor of the vehicle in a generally lateral direction from an outer side of the second side portion to a fourth point proximate the third point;
    forming a second gap between the second side portion and the center portion; and
    coupling a second insert panel between the second side portion and the center portion to traverse the second gap.

19. A method of forming an automotive vehicle having a body with a floor and a frame comprising the steps of:

cutting the floor of the vehicle in a generally longitudinal direction from a rear of the vehicle and terminating said cutting at a first point rearward of a first front wheel well to form a first side portion and a center portion;

cutting a wedge-shaped cut in the floor of the vehicle that extends generally laterally from an outer side of the first side portion to a second point proximate the first point;

forming a first gap between the first side portion and the center portion by spreading the side and center portions apart from each other about said first point;

coupling a first insert panel between the first side portion and the center portion to traverse the first gap;

cutting the floor of the vehicle in a generally longitudinal direction from the rear of the vehicle forward and terminating said cutting at a third point rearward of a second front wheel well to form a second side portion, said center portion being disposed between the first side portion and the second side portion;

cutting a wedge-shaped cut in the floor of the vehicle that extends generally laterally from an outer side of the second side portion to a fourth point proximate the third point;

forming a second gap between the second side portion and the center portion; and coupling a second insert panel between the second side portion and the center portion to traverse the second gap.

* * * * *